(12) United States Patent
Gutiérrez Robledo et al.

(10) Patent No.: US 11,633,267 B2
(45) Date of Patent: Apr. 25, 2023

(54) DENTAL BLANK WITH AN INSERT

(71) Applicant: COLTÈNE/WHALEDENT AG, Altstätten (CH)

(72) Inventors: Nicolàs Gutiérrez Robledo, Madrid (ES); Ralf Boehner, Kriessern (CH)

(73) Assignee: COLTÈNE/WHALEDENT AG, Altstätten (CH)

( * ) Notice: Subject to any disclaimer, the term of this patent is extended or adjusted under 35 U.S.C. 154(b) by 504 days.

(21) Appl. No.: 16/622,379

(22) PCT Filed: Jun. 12, 2018

(86) PCT No.: PCT/EP2018/065522
§ 371 (c)(1),
(2) Date: Dec. 13, 2019

(87) PCT Pub. No.: WO2018/229060
PCT Pub. Date: Dec. 20, 2018

(65) Prior Publication Data
US 2020/0197139 A1     Jun. 25, 2020

(30) Foreign Application Priority Data

Jun. 14, 2017  (EP) .................................. 17175940

(51) Int. Cl.
*A61C 13/00*     (2006.01)
*A61C 13/273*   (2006.01)
*A61C 13/08*     (2006.01)
*A61C 13/09*     (2006.01)

(52) U.S. Cl.
CPC ........ *A61C 13/0022* (2013.01); *A61C 13/081* (2013.01); *A61C 13/273* (2013.01); *A61C 13/09* (2013.01); *Y10T 428/12229* (2015.01)

(58) Field of Classification Search
None
See application file for complete search history.

(56) References Cited

U.S. PATENT DOCUMENTS

| | | | |
|---|---|---|---|
| 2015/0216635 A1 | 8/2015 | Schweiger | |
| 2016/0199159 A1* | 7/2016 | Brehm | B29C 43/52 264/16 |
| 2017/0057865 A1 | 3/2017 | Kim et al. | |

FOREIGN PATENT DOCUMENTS

| | | | |
|---|---|---|---|
| KR | 2013 0097820 A | 9/2013 | |
| WO | 2011/056452 A2 | 5/2011 | |

OTHER PUBLICATIONS

European Search Report Corresponding to 17175940.0 dated Nov. 29, 2017.
International Search Report Corresponding to PCT/EP2018/065522 dated Aug. 9, 2018.
Written Opinion Corresponding to PCT/EP2018/065522 dated Aug. 9, 2018.

* cited by examiner

*Primary Examiner* — Elizabeth Collister
(74) *Attorney, Agent, or Firm* — Finch & Maloney PLLC

(57) ABSTRACT

A dental blank for the manufacture of a dental restoration. The dental blank comprises a dental block and an insert with an opening facing toward an outer surface of the dental blank. The insert comprises at least one positioning element for the positioning of an abutment.

12 Claims, 3 Drawing Sheets

DENTAL BLANK WITH AN INSERT

Figure 1:
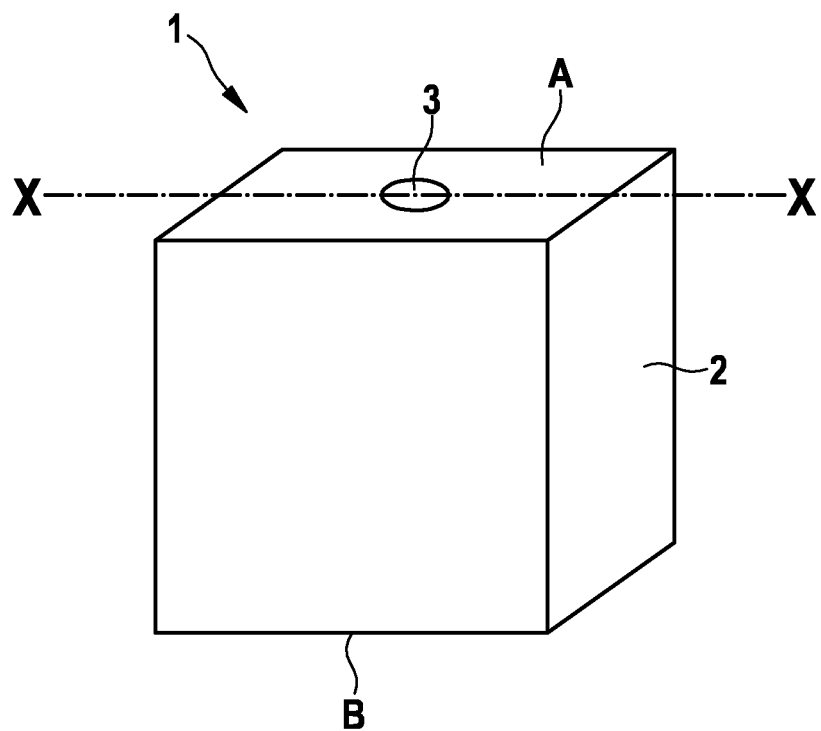

The present invention relates to a dental blank for the manufacturing of a dental restoration, a dental restoration made from a dental blank and a method for the production of a dental blank and a method for the production of an insert.

There are three major components used in a complete prosthetic restoration: a fixture as substitute for the tooth root, an abutment as substitute for the tooth's internal structure and the prosthetic component in the shape of the tooth crown. The prosthetic crown is usually made from ceramic or composite materials, which can be manufactured by CAD/CAM devices. The abutments used for CAD/CAM technologies have a defined shape with a "rotational stop". Combining the defined shape of the abutment with the corresponding bore in the material block for the prosthetic crown makes it possible to connect the abutment with the CAD/CAM generated crown extraoral without using a model. The abutment and the fixture are normally made of titan. Titan is on the one hand known to be biocompatible and on the other hand the abutment and the fixture can be produced by milling with a good degree of precision.

The drawback of using titan is the visibility of the abutment when prosthetic crowns with a translucency >15% are used. It is, however, difficult to produce abutments and fixtures from composite material since the required high degree of precision for joining the prosthetic components together cannot be achieved.

It was thus an object of the present invention to overcome the drawbacks of the prior art, to ensure a proper alignment and securing of the prosthetic components and to improve the appearance of a dental restoration.

The object has been solved by a dental blank, a dental restoration and a method as outlined below.

The invention relates to a dental blank for the manufacturing of a dental restoration. The dental blank comprises a dental block and an insert with an opening facing towards an outer surface of the dental blank. The insert can be a sleeve, wherein "sleeve" as used herein means an insert with the shape of a, preferably at least on one side open, hollow cylinder. The insert comprises at least one positioning element for the positioning of an abutment. The positioning element preferably contains at least one anti-rotation element. The anti-rotation element can be provided in the form of a recess fitting with a complementary counterpart in the abutment, such as a protrusion.

The dental blank with an insert has the advantage that dental restoration provide a coverage for an abutment. Further the insert provides a secure connection between the abutment and the dental restoration, thus ensuring a proper alignment between the prosthetic components. Anti-rotation elements avoid a contortion of the dental restoration.

The insert may be configured to receive an abutment essentially by form-locking. Form-locking could be achieved by e.g. providing a recess in the insert and a respective protuberance in the abutment. Form-locking may also refer to a tight and fully enclosure of the abutment by the insert. The abutment should be entirely covered by the insert.

The form of the insert may be given by the form of a known abutment such as TiBase®-Sirona, Straumann®-Variobase or Camlog®-Titanbasis.

Such a configuration provides a secure connection between the dental restoration and the abutment.

Preferably, the insert has a translucency of <5%.

The determination of the translucency, e.g. of a composite, was conducted as follows:

Measurement was performed with a UV/Vis Spectrophotometer (Specord 210, AnalytikJena) according to instructions adjusted by AnalytikJena, colour measurements and determination of the translucency of the dentin, reference-number: 02/2010.

The Integrating sphere allows the measurement of transmittance and reflectance pf scattering solid and liquid samples as well as powder samples. For determining the translucency of dental material reflection spectra are recorded in the visible range. The spectra will be analysed by means of a colour software.

The spectral element of the sphere was used as references. For determining the translucency, a plate of 1 mm, which was measured without background (black standard) and which was measured with a white standard as background was used. The white standard was also used as reference.

The recoding of the reflectance spectra was done by adjusting the illuminant D65 and an observer to 10°. The following parameter adjustments were performed:

| Device | Specord 210 |
|---|---|
| Accessories | integrating sphere |
| Display | transmittance |
| Correction | reference |
| Gap | 4 nm |
| Light exchange | 320 nm |
| Measurement mode | stepwise |
| Range [nm] | 380-780 nm |
| Step width [nm] | 1 nm |
| Integration time [s] | 0.2 s |

For examining the accuracy of the method, three certified colour standards were measured.

The translucency T (in %) has been calculated using the following formula:

$$\% \, T = ((L_{white} - L_{black})/L_{white}) \times 100\%$$

An insert with a low translucency provides an ideal coverage for an abutment, in particular for an abutment made of titan. Thus, the abutment remains invisible after the implantation of the prosthetic components.

Preferably, the insert comprises or is made of oxide or silicate ceramics or composite material. The composite comprises an organic matrix and a filler. The matrix can be made of a synthetic material, e.g. methylacrylate. The filler can be an inorganic material, e.g. barium glass or strontium glass; mixed oxides such as $SiO_2$, $ZrO_2$ and/or $TiO_2$; or silica. The insert is preferably white or tooth coloured in adaptation to the "Vitapan classical Shade Guide" (Vita Zahnfabrik, Bad Säckingen).

Ceramic or composite material provides a low translucency. Ceramic is processable with a high degree of precision compared to commonly used composite material for the dental block. A ceramic insert can be processed such that it precisely fits the abutments thus providing a secure attachment of the dental restoration to the abutment. The processing of the insert is easier than a respective processing of the dental block.

The insert may be integrally attached to the dental block. It is possible, that the insert and the dental block of the dental blank are obtained by molding. The material for forming the dental block is preferably molded around the insert and cured. Curing may lead to a bonding of the insert to the dental block by a chemical reaction between the materials.

In any case, "integrally attached" means that no further fastening means are required. The dental block and the insert are formed in one production step, thus facilitating the production of the dental restoration. Further, less material for the manufacturing of the dental restoration is required.

The insert may be affixed in the dental block by means of a fastening material. Such fastening material can be an adhesive and/or primers known in the art. The insert may be obtained by molding as described above. The insert may also be produced in a separate step and attached to an opening in the dental block.

The fastening material ensures a secure attachment of the insert in the dental block. By using fastening material, the insert can be produced separately and inserted at a later step of the production of the dental restoration. The choice of the material of the insert is more flexible.

The insert may have a wall thickness of 0.2 to 1 mm.

Preferably, the material of the dental block is made from composite material.

The composite material of the dental block may comprise an organic matrix and a filler. Suitable composite materials comprise a synthetic matrix (organic phase), which is mixed with an inorganic, preferably solid, filler (inorganic phase). Advantageous the organic synthetic matrix comprises at least one methylacrylate and/or the inorganic filler at least one glass, barium glass and strontium glass are preferably used.

Further inorganic fillers are amorphous, e.g.: spherical materials on the basis of mixed oxides such as $SiO_2$, $ZrO_2$ and/or $TiO_2$; micro-fine fillers such as fumed silica or precipitation silicic acid; macro (particle size of 5 µm to 200 µm) or micro (particle size of 0.3 µm to 5 µm) fillers such as quartz, glass ceramics, or glass powder with a mean particle size of 0.3 µm to 5 µm; X-ray opaque fillers such as ytterbium trifluoride. The filler may also comprise micro-filler complexes such as hybrid-composite and nanoparticle. Further, glass fibers, polyamide or carbon fibers may also be used as fillers. The surface of the filler is usually silanized to enable a connection with the organic matrix.

Further suitable polymerizable mono- or multifunctional monomers of the organic phase are mono(meth)acrylate, such as methyl-, ethyl-, butyl-, benzyl-, furfuryl-oder phenyl (meth)acrylate, multifunctional acrylates and methacrylate such as Bisphenol-(A)-di(meth)acrylate, Bisphenol-A-glycidylmethacrylate (known as "Bis GMA", which is a product from the addition of methacrylic acid and Bisphenol-A-diglycidylether), UDMA (product of the addition of 2-hydroxyethylmethacrylate and 2,2,4-hexamethylenediisocyanate), di-, tri- and tetraethyleneglycodi(meth)acrylate (e.g. TEGDMA), decandioldi(meth)acrylate, trimethylolpropanetri(meth)acrylate, pentaerythritol-tetra(meth)acrylate and butanedioldi(meth)acrylate, 1,10-decanedioldi(meth)acrylate or 1,12-dodecanedioldi(meth)acrylate. Further, organic phases comprising methacrylate modified polysiloxanes are known.

Composite material provides a good hardness and long-lasting dental restoration.

The dental block may be in the form of a cube. The width of the dental block may be between 0.5 to 5 cm, preferably 1 to 3 cm. The base area of the dental block may be in the range from 0.25 to 25 $cm^2$, preferably 1 to 9 $cm^2$. Dimensions of 12 cm×3 cm, preferably 10 cm×2.5 cm, are also possible. The dental block may also have a triangular, circular, half-circular, or a polygonal such as octahedral, base area.

In this way, dental restorations of different sizes may be produced.

The dental block may be provided with an opening for receiving the insert. The opening is preferably placed in the center of the dental block. But it is also possible to provide the opening at a position different from the center.

The material of the dental block may have a translucency of 10%-40%. Such a translucency provides the appearance of a natural tooth and thus cannot be distinguished from the natural teeth. Preferably, the insert does not extend over an outer surface of the dental block.

By not extending over the outer surface of the dental block, the insert remains invisible even if the tooth neck is partially uncovered by the gingiva. Thus, the natural appearance of the dental restoration may even be assured in the case of an exposed tooth neck.

A support element may be attached to a surface of the dental blank. Preferably the support element is a holder for the placement of the dental blank in a CAD/CAM machine.

The dental restoration may be obtainable through grinding or milling and may be adjusted to the customer's teeth profile.

Support elements facilitate the processing of the dental blank by a secure placement of the dental blank into the machine.

Preferably, an access path for a fastening element, preferably a screw, is located within the dental blank. The access path has an opening facing towards the outer surface of the dental blank. The access path is configured to fasten a dental restoration made from the dental blank to an abutment by use of a fastening element.

The access path is interconnected with the insert. If the insert is provided as a sleeve, the access path is in linear progression with a cavity defined by the sleeve.

Preferably, the opening of the path and the opening of the insert are on opposing faces of the dental blank.

The access path has the advantage that the prosthetic components can be fastened to each other by additional fastening elements. The access path may be closed after fastening by conventionally sealing material known in the art.

A further aspect of the invention relates to a dental restoration made from a dental blank as previously described.

The dental restoration may resemble a natural tooth. The dental restoration may be adjusted to the costumer's teeth surrounding the dental restoration such that the dental restoration may not be distinguishable from the natural teeth.

A further aspect of the invention relates to a method for the production of a dental blank comprising a dental block and an insert. The method comprises the step of affixing the insert in the dental block.

The insert may be affixed by either integral attachment or by fastening the insert to the dental block.

Integral attachment may be achieved by molding the dental block material around the insert. The insert may be placed in a respective mold and the material for forming the dental block, in particular the composite material, may be injected around the insert. Afterwards the material for forming the dental block is cured. Curing may be achieved through a chemical reaction between the material of the dental block and the material of the insert.

The insert may also be attached to the dental block by fastening material such as an adhesive or primer known in the art. The insert may be produced in a separate step and placed in an opening of the dental block or, as described above, may be placed in a mold to form the dental block around the insert. It is also possible that the insert is attached to the dental block via a mechanical mechanism such as snap-fit.

A further aspect of the invention relates to a method of producing an insert for use in a dental blank as previously described and/or a method as previously described. The insert is produced by an injection molding process, and, optionally, subsequent sintering.

The insert may either be produced in a separate production step and afterwards incorporated into the dental block or produced in one step together with the dental block.

The invention will be further outlined in the following reference to preferred embodiments with examples and drawings, without being limited thereto.

FIG. 1: shows a schematic drawing of a dental blank according to the present invention.

Figure 2:
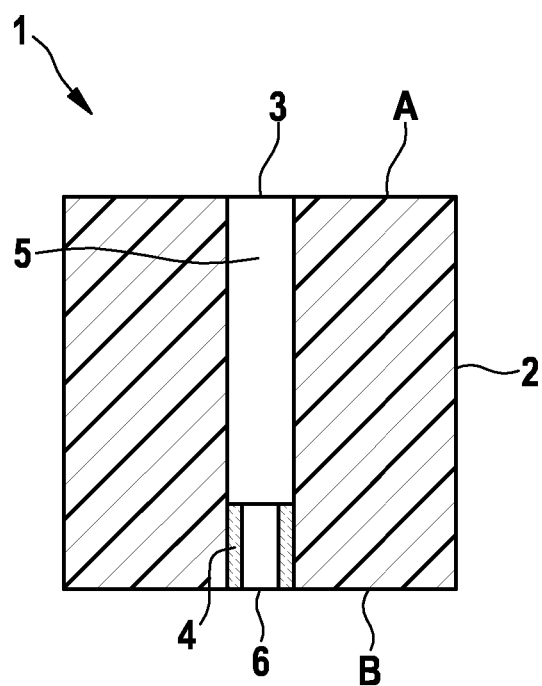

FIG. 2: shows a sectional view along the axis X-X of the dental blank in FIG. 1.

Figure 3:
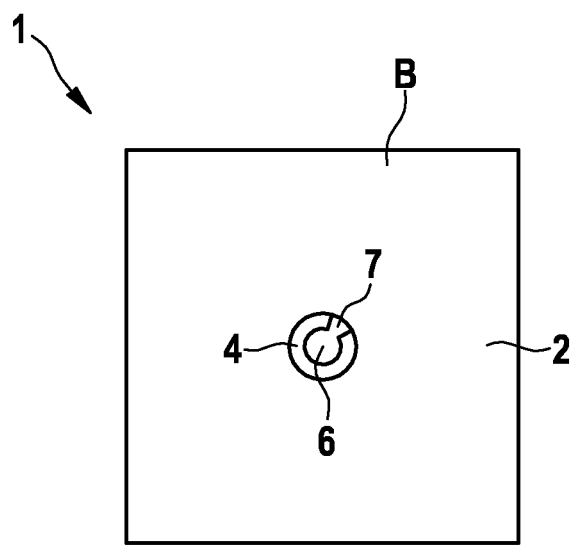

FIG. 3: shows a top view on the B surface of the dental blank from FIG. 2.

Figure 4:
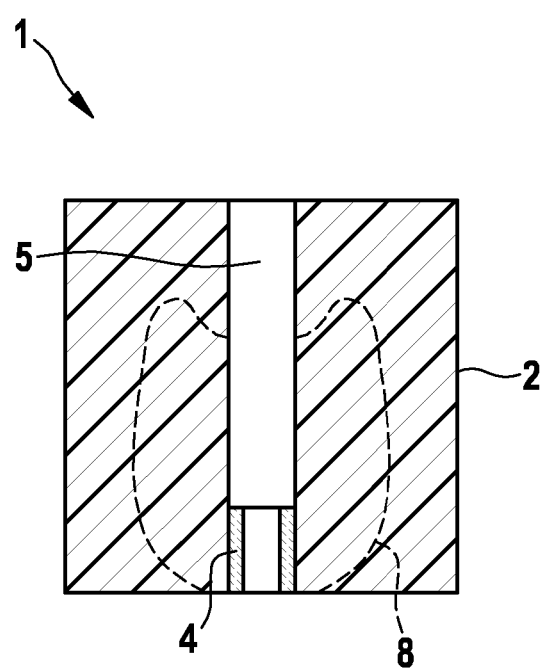

FIG. 4: shows a sectional view of the dental blank with contour of a dental restoration.

Figure 5:
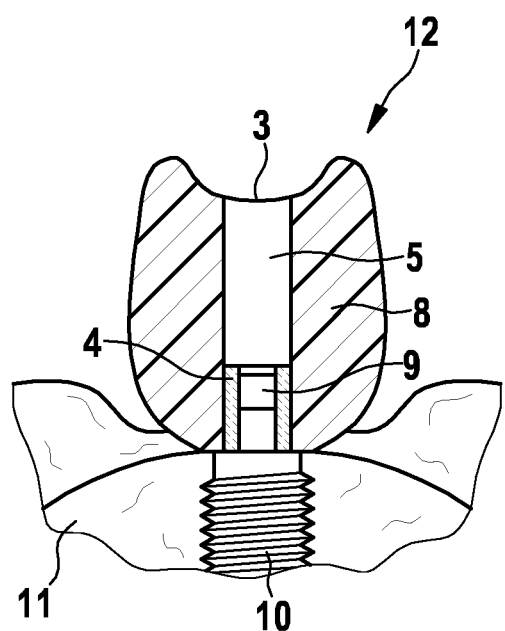

FIG. 5: shows a prosthetic implant with a dental restoration made from a dental blank according to the invention.

FIG. 1 shows a dental blank 1 according to the invention. The dental blank 1 has the shape of a cube with the dimensions 1.6×1.6×1.6 cm. The dental blank 1 comprises a dental block 2 and has an outer surface A with an opening 3 providing access to an access path (not shown). The dental blank 1 has a further outer surface B.

FIG. 2 shows a sectional view of the dental blank 1 along the X-X axis from FIG. 1. The opening 3 is facing towards the outer surface A. The opening 3 gives access to an access path 5. A further opening 6 of an insert 4 is facing towards the outer surface B. The insert 4 is designed as a sleeve and is in linear progression with the access path 5. The insert is made of ceramic. The opening 3 of the access path 5 and the opening 6 of the insert 4 are on opposing faces A and B of the dental blank.

FIG. 3 provides a top view on the outer surface B. The opening 6 is in the center of the dental block 2. The insert 4 is affixed to the dental block 2. The insert 4 does not extend over the outer surface B of the dental block 2. The insert 4 comprises a recess 7 that can interact with a protrusion in an abutment (not shown).

FIG. 4 shows the sectional view of FIG. 2 with a contour of dental restoration 8. The dental restoration will be obtained by milling of the dental blank.

FIG. 5 shows an implanted device 12 with a dental restoration 8 according to the invention obtained from a dental blank 1 by milling. A fixture 10 is secured in the jawbone 11. An abutment 9 connects the fixture 10 with the dental restoration 8. The abutment 9 is fully surrounded by the insert 4. The opening 3 of the access path 5 provides access for fastening means such as a screw (not shown). The screw may fasten the fixture 10, the abutment 9 and the dental restoration 8 together. The access path 5 may than be closed by filling and sealing material known in the art.

The invention claimed is:

1. A dental blank for the manufacturing of a dental restoration comprising:
   a) a dental block made from composite material having a translucency of 10%-40%, and
   b) an insert made of ceramic or composite with an opening facing towards an outer surface of the dental blank, wherein the insert comprises at least one positioning element for the positioning of an abutment.

2. The dental blank according to claim 1, wherein the insert is configured to receive an abutment essentially by form-locking.

3. The dental blank according to claim 1, wherein the insert has a translucency of <5%.

4. The dental blank according to claim 1, wherein the insert is integrally attached with the dental block.

5. The dental blank according to claim 1, wherein the insert is affixed in the dental block by a fastening material.

6. The dental blank according to claim 1, wherein the insert does not extend over an outer surface of the dental block.

7. The dental blank according to claim 1, wherein a support element, a holder for placement in a CAD/CAM machine, is attached to a surface of the dental blank.

8. The dental blank according to claim 1, wherein an access path for a fastening element is located within the dental blank, wherein the access path is configured to fasten a dental restoration made from the dental blank to an abutment by use of a fastening element.

9. The dental blank according to claim 8, wherein the opening of the path and the opening of the insert are on opposing faces of the dental blank.

10. A dental restoration made from a dental blank according to claim 1.

11. A method of producing an insert for use in the dental blank according to claim 1, wherein the insert is produced by an injection molding process.

12. The method of producing an insert for use in the dental blank according to claim 1, wherein the insert is produced by an injection molding process, and, subsequent sintering.

* * * * *